W. R. MATTHEWS.
COUPLING CENTERING AND DRAFT RIGGING DEVICE.
APPLICATION FILED MAY 22, 1907.
907,072.
Patented Dec. 15, 1908.
4 SHEETS—SHEET 3.
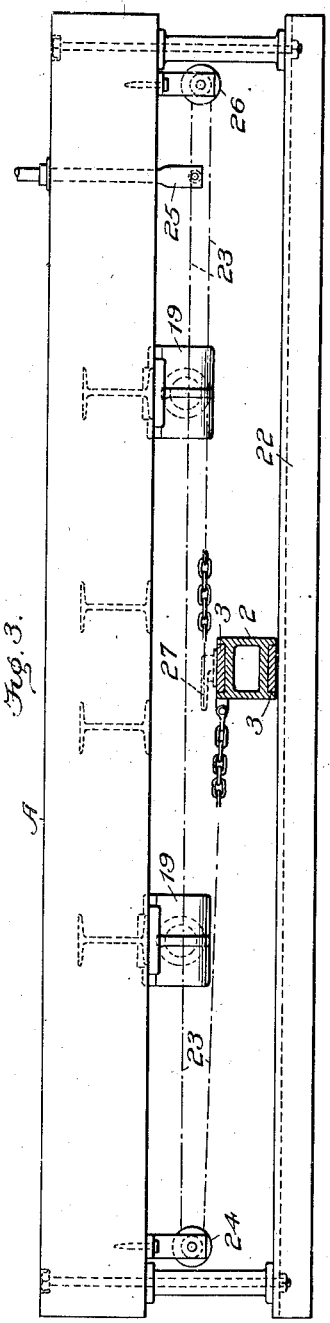
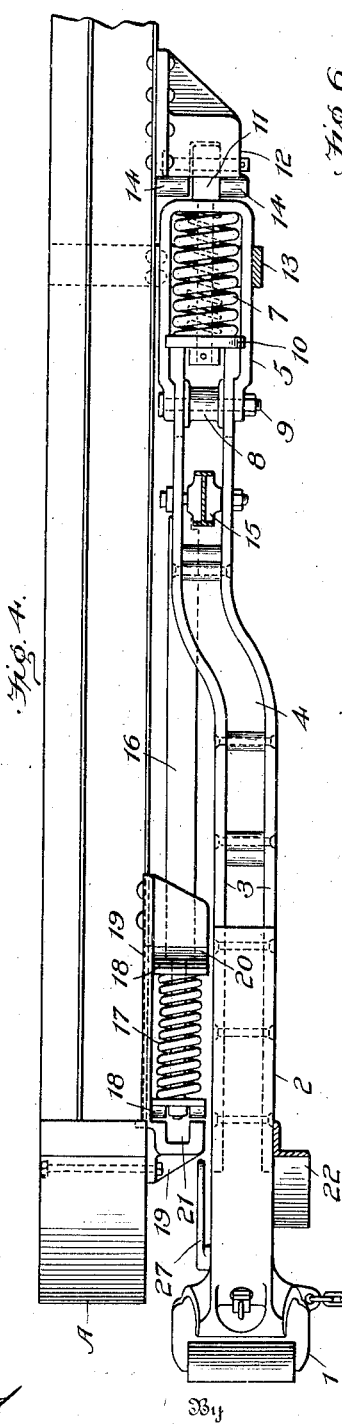
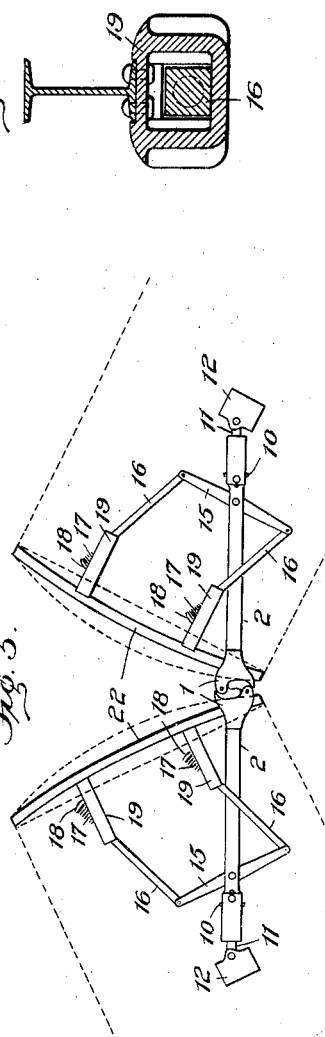

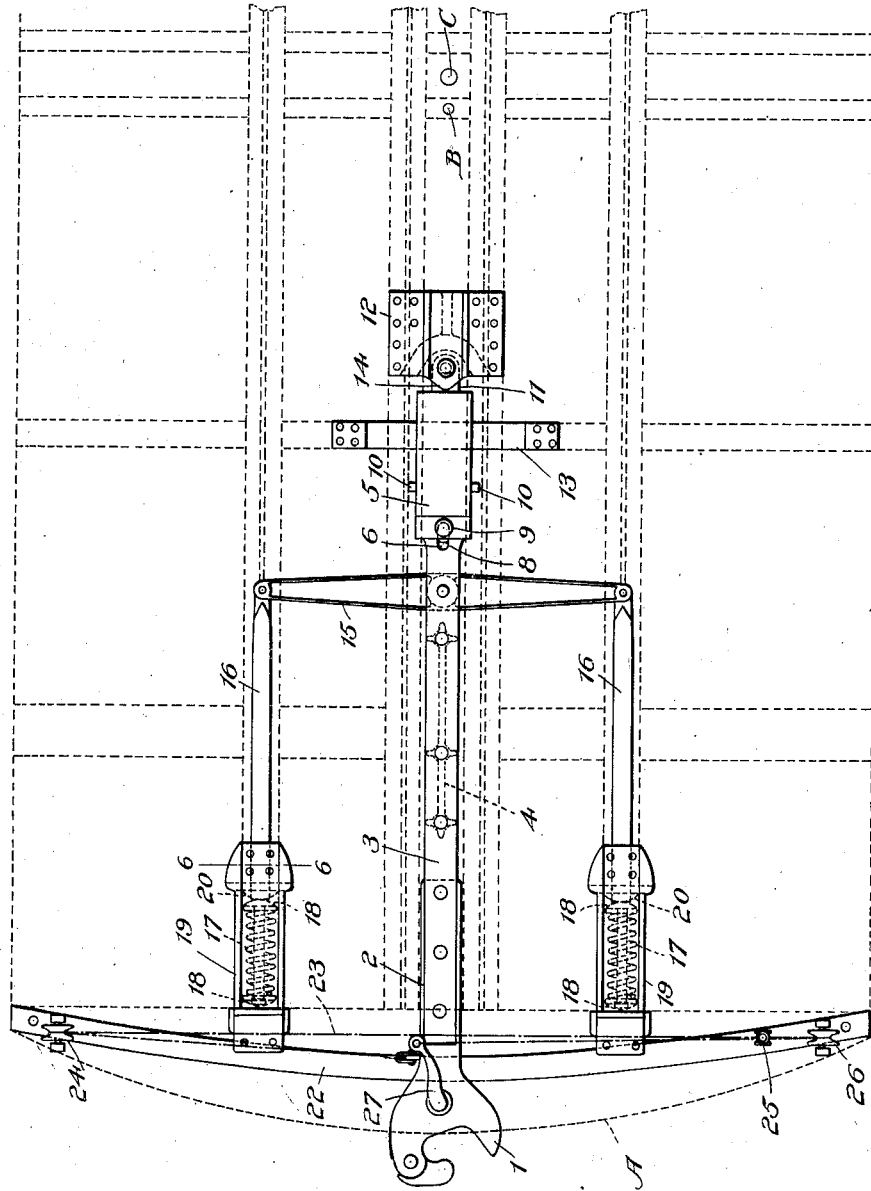

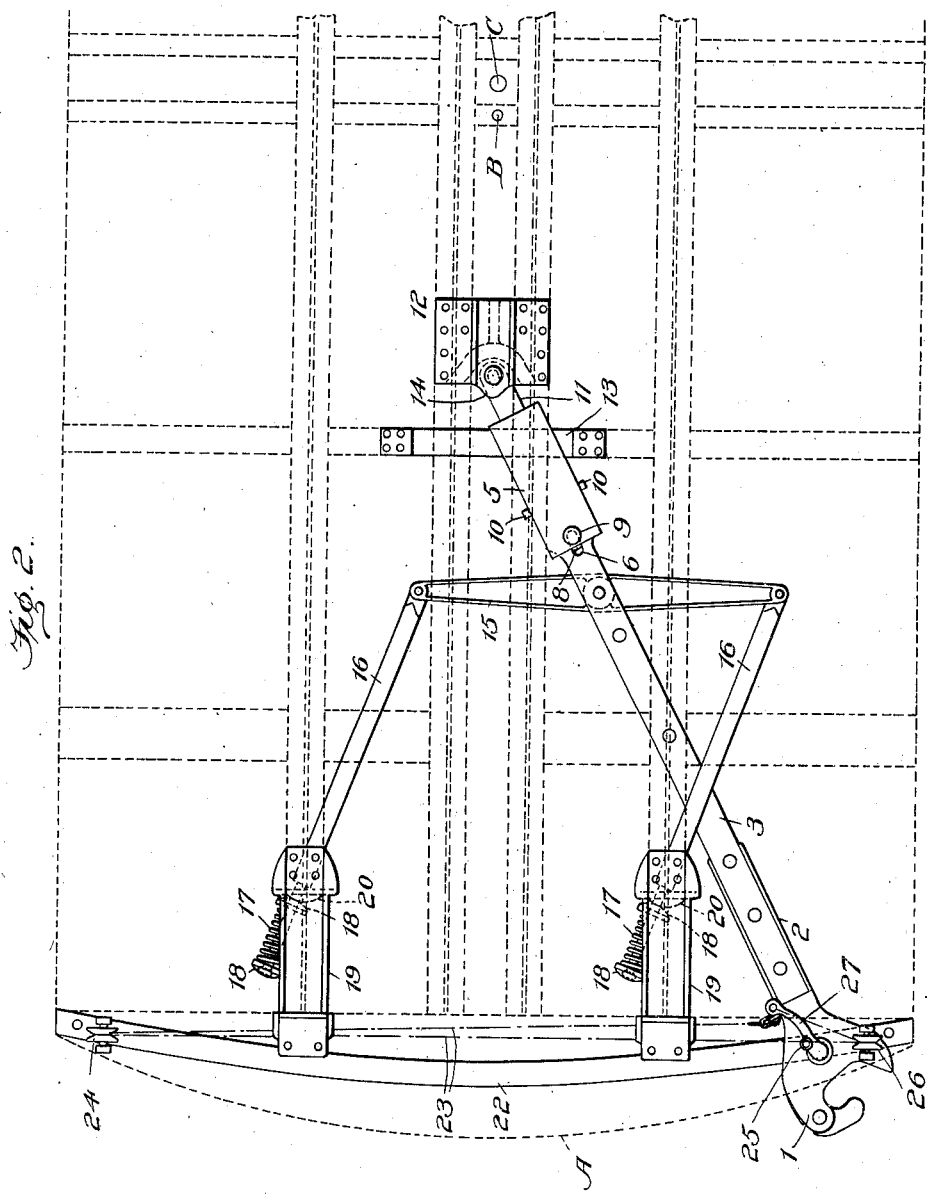

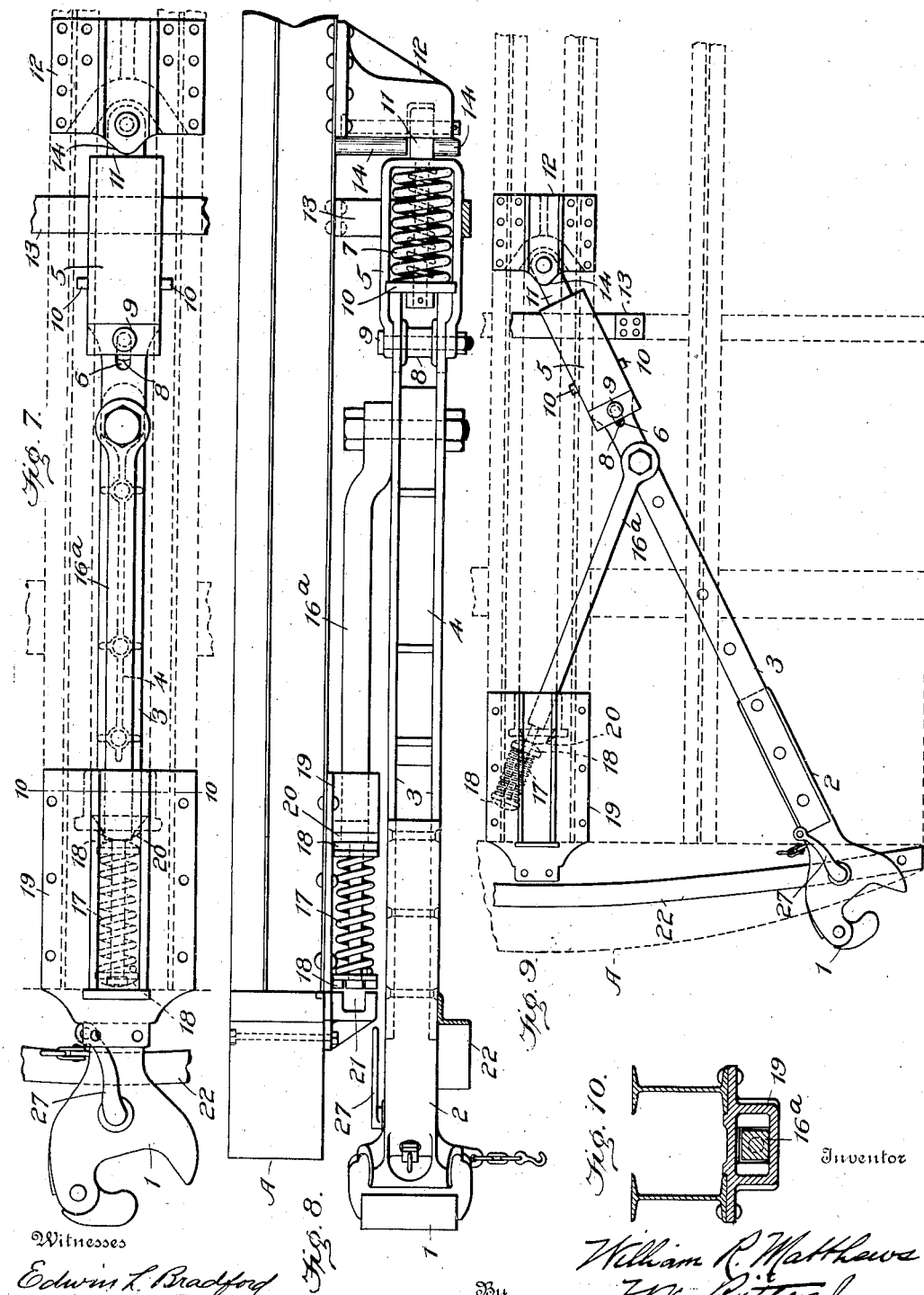

UNITED STATES PATENT OFFICE.

WILLIAM R. MATTHEWS, OF PITTSBURG, PENNSYLVANIA, ASSIGNOR TO THE McCONWAY & TORLEY COMPANY, OF PITTSBURG, PENNSYLVANIA, A CORPORATION OF PENNSYLVANIA.

COUPLING-CENTERING AND DRAFT-RIGGING DEVICE.

No. 907,072.   Specification of Letters Patent.   Patented Dec. 15, 1908.

Application filed May 22, 1907. Serial No. 375,066.

*To all whom it may concern:*

Be it known that I, WILLIAM R. MATTHEWS, a citizen of the United States, residing at Pittsburg, in the county of Allegheny and State of Pennsylvania, have invented certain new and useful Improvements in Coupler-Centering and Draft-Rigging Devices; and I do hereby declare the following to be a full, clear, and exact description of the invention, such as will enable others skilled in the art to which it appertains to make and use the same.

My invention relates to a coupler centering and draft rigging device for railway cars, and has for its principal object to provide a simple, durable and efficient structure which, while tending to maintain the coupler in a central position, will permit such coupler to swing toward the sides of the car when passing around curves.

By the use of my invention the coupler is relieved of undue lateral strains, the pull of one car upon another is in a direct line, and the cars may pass around much sharper curves than the usual arrangement of coupler and draft rigging will permit.

In the drawings chosen for the purpose of illustrating my invention, the scope whereof is pointed out in the claims: Figure 1 is a plan view of a coupler centering and draft rigging device embodying my invention, the underframing of a car to which it is attached being shown in dotted lines; Fig. 2 is a view similar to Fig. 1, but showing the relative positions of the parts when the coupler is swung toward the side of the car, as in curving; Fig. 3 is an end elevation of the car platform showing the devices by which the coupler is supported and the means employed for unlocking the coupler; Fig. 4 is a side elevation of the devices shown in Figs. 1 and 2, the coupler being in a central position; Fig. 5 is a diagrammatic plan view showing the positions assumed by the draft rigging appliances when the cars to which they are attached are passing around a sharp curve; Fig. 6 is a detail section taken on the line 6—6, Fig. 1, illustrating the manner of attaching certain spring abutments to the car framing; Fig. 7 is a plan view of a modified embodiment of my invention, parts of the car framing being shown in dotted lines; Fig. 8 is a side elevation of the modified construction shown in Fig. 7; Fig. 9 is a view similar to Fig. 7, but illustrating the positions assumed by the parts when the car passes around a curve; and Fig. 10 is a detail section taken on the line 10—10, Fig. 7, showing the manner of attaching the equalizer-spring abutment to the car framing.

Like symbols refer to like parts wherever they occur.

I will now proceed to describe my invention more fully, so that others skilled in the art to which it appertains may apply the same.

The coupler consists of a head 1 and a rearwardly extending shank or stem which is pivotally connected to the underframing of the car in a yielding manner. For the sake of lightness it is preferred to construct the inner portion of the stem as a pair of plates 3 which are separated by a vertical web casting 4, the plates and web casting being riveted together to form, in effect, a built-up I-beam. The forward ends of the plates 3 fit in depressed seats formed in that portion of the stem 2 which is integral with the coupler head, the two sections of the stem being firmly united by bolts or rivets.

To the inner end of the stem 2 a yoke or spring-pocket 5 is attached through a pin and slot connection, the plates 3 being, for this purpose, formed with slots 6 which are each of a length substantially equal to the amount of compression of which the draft spring 7 is capable. For the purpose of preventing any possible buckling of the plates 3 during a buffing operation, it is preferred to interpose between said plates a spool or hollow column 8 through which and through the slots 6 the bolt 9 connecting the stem 2 and yoke 5 passes. The extreme inner ends of the plates 3 bear against a follower 10 which is longitudinally movable with respect to the yoke 5. Within the spring 7 is a bolt 11 the forward end of which passes through an aperture formed in the follower 10, and the rear end of which terminates in a head that is pivotally connected to the draft member 12 secured to the car framing. The forward end of the bolt 11 is provided with a nut that bears upon the forward face of the follower 10, by which means the draft spring 7 is compressed when the coupler moves forward, as will hereinafter appear.

The socket formed in the draft member 12 for the reception of the spring bolt 11 is constructed with outwardly diverging walls that permit the coupler to have the desired range of pivotal movement, and in order to efficiently support the rear end of the yoke 5 under buffing shocks and at the same time permit this pivotal movement, the forward face of the member 12 is provided with the curved projections 14.

To the end that the bolt 11 may be relieved from strains due to the weight of the several devices, the yoke 5 is arranged to slide on, and be supported by, a carry-iron 13 which is riveted to the underframing; and in order that the bolt 11 and its pivot pin may not be subject to shearing strains when buffing occurs, it is preferred to enlarge or slightly elongate the hole in the rear end of the spring bolt 11, so that, in buffing, the rear end of the yoke 5 may engage the curved projections 14 and thus transmit all the strain directly to the draft member 12.

So far as thus described, the parts of both illustrated forms of my invention are the same, except that in one case the stem 2 is straight and in the other it is off-set, and except that in the modified construction the web 4 between the plates 3 is extended rearwardly beneath the point of pivotal support of the single equalizer arm employed in such modified construction.

In the construction illustrated in Figs. 1 to 6, inclusive, of the drawings, 15 is an equalizer member which is pivotally attached at its center to the coupler stem 2 at a point somewhat in advance of the yoke or spring-pocket 5. To each end of the equalizer 15 a forwardly extending equalizer arm 16 is pivotally secured.

In the construction shown in Figs. 7, 8, 9 and 10, but a single equalizer arm 16ª is employed, such arm being directly pivoted to the coupler stem 2 at a point corresponding to the point of pivotal attachment of the equalizer 15.

In both forms of construction in which my invention is exhibited, each forwardly extending equalizer arm has a reduced outer end upon which an equalizer spring 17 is confined between followers 18 by means of a nut. The outer faces of the followers 18 are made cylindrical in order to permit easy movement of the equalizer arm when either of the followers is in contact with a part of the equalizer-spring abutment 19. The inner end portion of each abutment 19 forms a yoke for the support of that equalizer arm 16 or 16ª which is slidably mounted therein. Upon the forward face of the yoke portion of the member 19 are formed cylindrical projections 20 with which the rear follower 18 is adapted to engage, while the forward portion of the abutment member is channeled out, as at 21, to permit the forward movement of the equalizer-arm. The manner of attaching the abutment members 19 to the adjacent sills of the car framing is shown in Figs. 6 and 10.

For the purpose of supporting the coupler as it moves from side to side, it is preferred to employ a curved supporting rail 22 which is suspended by bolts or in other suitable manner from the corners of the car.

As a means for unlocking the coupler in any position it may occupy, a flexible member such as a chain 23, is attached at one end to the coupler head, thence passed around a pulley 24 at one corner of the car, then over a roller carried by the forked end of the staff 25, thence around a pulley 26 at the other corner of the car, and, finally, is attached to the horizontally extending arm 27 of the coupler lock. In the drawings the flexible member 23 is, for convenience, represented by a dot and dash line. When the forked jaw of the staff 25 is in proper position to let the chain 23 pass freely, such chain will be moved around the pulleys 24 and 25 as the coupler swings from side to side. If at any time it is desired to unlock the coupler, it is only necessary to turn the staff 25, thus causing the chain to pull upon the coupler lock 27.

The operation of the mechanism illustrated in Figs. 1 to 6, inclusive, of the drawings, will be as follows. When the parts are in their normal positions, as seen in Fig. 1, a draft strain upon the coupler will cause the draft spring 7 to be compressed between the rear end of the yoke 5 and the follower 10, the latter being held against forward movement by the spring bolt 11. The forward movement of the coupler also causes a corresponding forward movement of the equalizer 15 and equalizer arms 16, as will be readily understood. This movement of the arms 16 causes a compression of the equalizer springs 17 between their respective followers 18, since the rear followers are carried forward by the shoulders upon the said arms 16 while the forward followers are supported by the abutment 19. It is preferred that each of the front followers 18 shall be normally out of contact with the abutment 19, as the initial resistance to a movement of the coupler under draft is thus somewhat decreased, and the turning movement of the equalizer arms 16 is somewhat facilitated, but such an arrangement is desirable only, not necessary.

In a buffing operation the yoke 5 moves rearwardly the slight distance necessary to insure its firm engagement with the lugs 14 of the draft member 12, thus relieving the spring bolt 11 and its pivot pin from strain, as before explained, after which the draft spring 7 is compressed as the follower 10 is forced rearwardly by the plates 3. The equalizer arms 16, by reason of their attachment to the equalizer 15, move rearwardly coextensively with the coupler, and the equalizer springs 17 are thus immediately compressed between their respective followers 18, as will be readily understood. When the coupler is displaced from its normal position in the longitudinal axis of the car, the parallel equalizer arms are likewise displaced, and as these equalizer arms are normally parallel to the longitudinal axis of the car, it will be observed that their changed angular positions, as each turns about its respective cylindrical projection 20 as a center, cause the equalizer 15 to move forward and sidewise while yet remaining parallel to itself. Since the equalizer 15 is attached to the coupler stem 2, this forward and sidewise movement is resisted by the draft spring 7, with the result that the lateral displacement of the coupler from its normal position causes compression, not only of the draft spring 7, but also of each of the equalizer springs 17. It will therefore be seen that while the coupler may swing from side to side, the compression thus induced in the springs always tends to restore it to normal position in the longitudinal axis of the car.

The operation of the modified construction shown in Figs. 7 to 10, inclusive, is substantially identical with that of the mechanism involving the use of a transverse equalizer 15, with the exception that the movements of the coupler are directly communicated to the single equalizer arm connected to the coupler stem 2.

While I have illustrated my invention as applied to a car having a rounded platform such as is commonly used on interurban lines having sharp curves, the coupler centering and draft rigging devices are generally applicable to cars of any type. In the drawings the outer edge of the curved platform is indicated by the dotted line A, the center of the curve being at a point B, slightly in advance of the truck center C.

From an inspection of Figs. 1 and 2 it will be noted that as the coupler swings from side to side its head projects a uniform distance from beneath the platform. It will therefore be apparent, that the coupler is in effect pivotally mounted at the platform center B adjacent to the truck center C. By this arrangement when cars provided with curved platforms pass around a curve, such platforms are maintained at a uniform distance apart in the line of draft of the couplers.

In practice it is preferred that the spring 7 shall be a standard draft spring, and that each of the equalizer springs 17 shall be one half the capacity of the draft spring.

Having thus described my invention, what I claim and desire to secure by Letters Patent is:

1. In a device of the character indicated, the combination with a coupler and means whereby it may be pivotally connected to the body of a car, of laterally movable spring pressed means connected to the stem of said coupler and operating to resist lateral and longitudinal displacements of said coupler, and a draft spring for resisting draft and buffing movements of said coupler.

2. In a device of the character indicated, the combination with a coupler which is provided with means whereby it may be pivotally connected to the body of a car in a yielding manner, of means which constantly tend to maintain said coupler in a central position, said last named means including a spring and offering resistance to an endwise movement of the coupler.

3. In a device of the character indicated, the combination with a coupler which is provided with means whereby it may be pivotally connected to the body of a car in a yielding manner through the medium of a draft spring, of a draft spring, and means whereby said draft spring is compressed when the coupler swings laterally.

4. In a device of the character indicated, the combination with a coupler which is provided with means whereby it may be pivotally connected to the body of a car, of an equalizer arm movable with said coupler, a spring which resists a longitudinal movement of the coupler and which is compressed by said equalizer arm through the medium of a lateral displacement of the coupler in either direction from its normal position, and means connecting said equalizer arm and coupler.

5. In a device of the character indicated, the combination with a coupler which is provided with means whereby it may be pivotally connected to the body of a car in a yielding manner through the medium of a draft spring, of a draft spring, an equalizer arm movable with said coupler and operating to cause a compression of said draft spring when the coupler is displaced laterally, an equalizer spring which is compressed by a lateral displacement of the coupler in either direction from its normal position, and means connecting said equalizer arm and coupler.

6. In a device of the character indicated, the combination with a car coupler which is provided with means whereby it may be pivotally mounted upon the body of a car, of means for varying the radial distance of the coupler head from its pivotal support when said coupler is swung laterally, said last-named means including a spring.

7. In a device of the character indicated, the combination with a car coupler which is provided with means whereby it may be pivotally mounted upon the body of a car in such manner as to permit a longitudinal movement with respect thereto, of means for yieldingly resisting the pivotal movement of the coupler, said last-named means including a spring resisting draft and buffing strains.

8. In a device of the character indicated, the combination with a coupler head and a coupler stem adapted to have a yielding longitudinal movement, of a spring for resisting longitudinal movement of said stem, a member pivotally connected to the coupler stem and yieldingly supported against longitudinal and lateral movements of said stem, and means whereby said coupler stem may be pivotally connected to the body of a car.

9. In a device of the character indicated, the combination with a coupler and means whereby it may be pivotally connected to the body of a car in a yielding manner, of an equalizer arm which is laterally movable with said coupler about a fixed portion of the car as a center and which operates to resist endwise movement of the coupler when said coupler is displaced laterally, and means connecting said equalizer arm and coupler.

In testimony whereof I affix my signature, in presence of two subscribing witnesses.

WILLIAM R. MATTHEWS.

Witnesses:
 FRANK J. BOWERY,
 F. D. ECKER.